May 30, 1967 H. R. WALKER ETAL 3,323,063

SYSTEM FOR RE-DIFFUSION OF RECEIVED RADIO SIGNALS

Filed Aug. 7, 1964

INVENTORS
HAROLD R. WALKER
IRA KAMEN
BY John J. Rogan
ATTORNEY

United States Patent Office 3,323,063

Patented May 30, 1967

3,323,063

SYSTEM FOR RE-DIFFUSION OF RECEIVED RADIO SIGNALS

Harold R. Walker, Metuchen, N.J., and Ira Kamen, New York, N.Y., assignors to Theodore Granik, New York, N.Y.

Filed Aug. 7, 1964, Ser. No. 388,112
6 Claims. (Cl. 325—51)

This invention relates to radio communications and more particularly it relates to methods and means for improving the volumetric coverage of a broadcast transmitter.

A principal object of the invention is to provide a novel system and method whereby broadcast signals can be efficiently disseminated in areas of widely different pick-up characteristics.

Another object is to provide methods and apparatus for radio broadcasts and the like, whereby the programs or specialized informational signal transmission can be efficiently disseminated within areas where ordinarily such signals are difficult of reception.

Another object is to provide radio program re-diffusion methods and apparatus whereby the program or specialized informational signals can be picked up in areas wherein they would ordinarily be difficult to pick up and without the necessity of employing specially sensitive radio receivers.

A further object is to provide novel methods and apparatus for enabling a listener to pick up and efficiently reproduce broadcast programs or specialized informational signals while located in shielded areas such as steel frame buildings, stadia, theaters and the like and without requiring realtively complicated and expensive radio receivers.

Another object is to provide a composite re-diffusion system whereby the greatest possible radio coverage can be provided, for example in a modern city having a multiplicity of large steel buildings or similar broadcast obstructional structures.

In certain situations, for example in stadia, theaters, etc., where a large number of people are congregated, it is possible to receive radio broadcast transmissions only from close by or powerful transmitters, and even then it requires comparatively highly sensitive and expensive radio receivers. Furthermore when a considerable number of such listeners are using their sets to reproduce the programs there is the tendency to set the volume to such a level that it becomes an annoyance to others attending the performance. Such annoyance could conceivably be overcome by restricting the use of such sensitive receivers to so-called ear-piece reception. However such receivers must have sufficient sensitivity to produce clearly audible volume in the ear-piece notwithstanding the shielding effect of the building structure, and even when the radio transmitter is a low power one.

Accordingly it is one of the principal objects of this invention to enable a person attending a performance for example in a stadium, theater, building or other radio-adsorptive structure, to hear the transmitted program or specialized informational signals clearly and with an extremely inexpensive radio receiver. In fact according to this phase of the invention it is possible to design a radio receiver of the transistor type employing as few as two inexpensive transistors which enables the listener to receive clearly the radio broadcast programs even from low power transmitters as well as special informational signals, and in many cases the receiver can be so inexpensive as to permit it to be distributed or used free of charge.

Another object relates to a system of radio transmission whereby programs or specialized informational signals can be re-diffused within a shielded or similar confined space such as steel frame buildings, stadia, theaters and the like, and the local re-diffusion process within the confined area is so arranged that it actually enhances or at least does not deteriorate the field strength or other desirable characteristics of the radio field external to the said area, and while complying with the re-radiation limitations of the FCC.

A feature of the invention relates to a novel method of re-diffusion of broadcast transmissions within a building or the like, whereby the local re-diffusion is effected by an induction field as distinguished from a radiation field which inductive field is derived from the original radio transmission but through the intermediary of selective wave polarization and phasing. As a concomitant to this feature undesired feedback is avoided during the re-diffusion process and the wave energy which is set up within the building is such that it enhances, or at least it does not deteriorate the field strength external of the building.

Another feature relates to a method of re-diffusing radio broadcast transmissions within a building or similar localized structure by converting the received broadcast carrier into a lower frequency carrier which frequency is chosen so as to be highly efficient in setting up a localized induction field within the building, which field is capable of radiating the received radio signals as well as other specialized informational signals for special purposes such as paging, theft protection and the like.

A further feature relates to a novel radio receiver of very inexpensive construction which can be used as a personal receiver for ear-piece reception only, but which nevertheless is capable of efficiently responding to an inductive field of a particular kind of electric vector polarization within a building or the like, and which automatically responds to a field of a different kind of electric vector polarization external of the building.

A further feature relates to a simplified and inexpensive radio receiver which is capable of automatically and selectively responding to radio transmissions of respectively different electric vector polarizations, and is also capable of responding to special signals such as paging signals, burglar alarm signals, etc.

A still further feature relates to the novel organization, arrangement, location and interconnection of parts which cooperate to provide a novel and improved radio broadcast and specialized signal communications system.

In the drawing which shows certain preferred embodiments:

Figure 1:
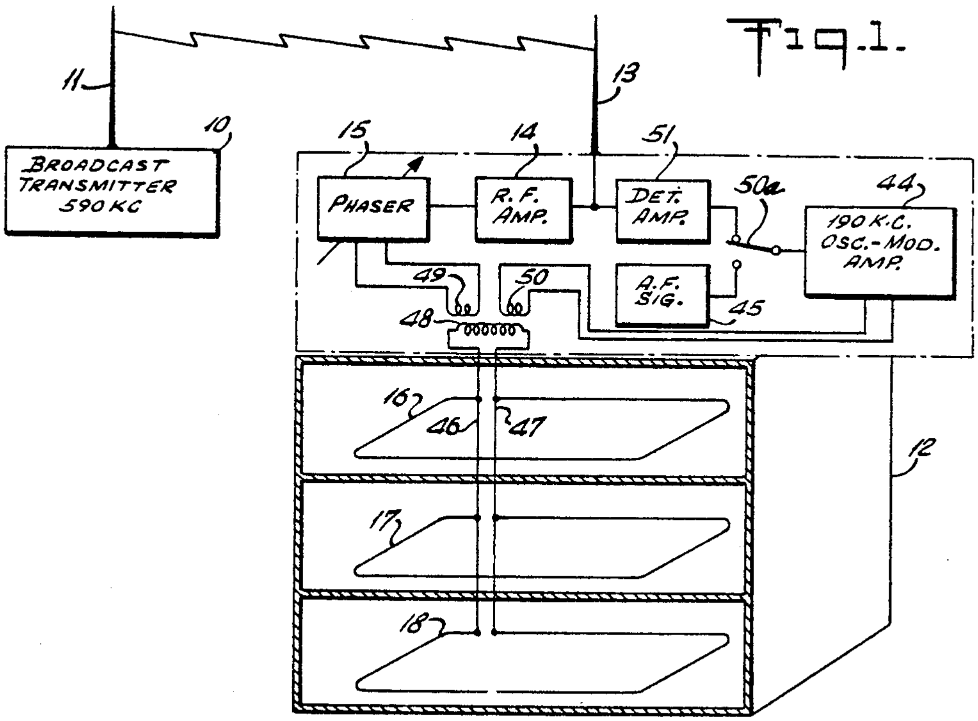
FIG. 1 is a schematic diagram of a system embodying certain features of the invention.

While the invention will be described as applied to a radio system of the amplitude modulation kind, it is equally well applicable to television systems, frequency modulation systems and the like.

It is generally accepted that radio waves of frequencies between 540 kc. and 1600 kc. have only limited power to penetrate into steel buildings, subways, tunnels, stadia, theaters and similarly shielded structures, including vehicles. Therefore in order to cover a large city in the areas including such structures the normal broadcast transmitter must have such a high ratio of signal to noise that it can be received on the conventional home receiver or automobile receiver. Since the average urban noise level is about 100 to 150 microvolts per meter it requires a signal strength of 1000–2000 microvolts per meter even for marginal coverage. Since such a signal is attenuated rapidly within steel structures, simple or inexpensive radio receivers are quite useless in such structures. It has been proposed heretofore to receive broadcast signals outside a building and to re-radiate them within the building to overcome the shielding effect of the building structure. Apart from the cost of such re-radiation systems, is the fact that they require in effect another source of radio carrier within the building. For example in one known system the signals are picked up by an antenna on the roof of the building, are then demodulated and the demodulated signals are used to modulate another radio frequency carrier within the building. However, because of the limitations prescribed by the Federal Communications Commission, there is a practical limit to the amount of radio frequency power that can be thus re-radiated within the building, because unavoidably it produces a field strength outside the building which would be in excess of the F.C.C. regulations. Furthermore such re-radiated power within the building tends to interfere with and deteriorate the original field from the transmitter, at least in the vicinity of the building. In an effort to meet the requirements of program re-diffusion within buildings it has been proposed heretofore to convert the picked-up broadcast carrier into a different carrier frequency which can be picked up locally at different points within the building by so-called inductive field pick-up as distinguished from radiation field pick-up. However, there again the signal strength for the pick-up field is limited by the amount of radio frequency power that can be used within the building, not to mention the cost of the equipment, and the field deterioration outside the building arising from the inductive field within the building, and also requiring expensive local receivers inside the building for picking up the inductive field signals.

We have found that by means of selective polarization between the electric vector of the broadcast transmitter waves and the electric vector of the local re-diffusion waves used within the building, it is possible to re-diffuse the broadcast programs within the building without undesirable feedback between the broadcast receiving equipment and the local receiving equipment within the building, and also at the same time preventing undesirable field pattern interference between the local fields within the building and the broadcast fields outside the building. Furthermore by converting the received radio frequency broadcast carrier to a corresponding carrier of a much lower frequency lying outside the broadcast band, it is possible to energize the inductive field producing means within the building at very high efficiency for inductive field pick-up. By producing such an efficient inductive field in the long wave-length range, for example 130–190 kc., the danger of producing an interfering field outside the building is practically eliminated. Likewise by selectively phasing the re-diffusion field within the building with relation to the broadcast field outside the building there is even less chance of external interference. In fact if the inductive field within the building is at the same carrier frequency as the original broadcast, then by such phasing control, any external radiation from within the building would tend to enhance the coverage of the radio transmitter outside the building. In other words, we provide a method which not only enables more efficient re-diffusion within a shielded structure, but which in certain cases actually aids the public service coverage of the broadcast transmitter itself.

In accordance with the generic aspects of the invention the original broadcast to be re-diffused within a shielded structure is received from the broadcast transmitter with one kind of polarization of the electric waves, and the re-diffused field within the structure derived from the broadcast carrier is produced with a different kind of polarization of its waves. If the two fields are at the same carrier frequency, then by proper phasing, the two fields can be efficiently used both within and outside the building. Furthermore because of their respectively different polarizations the chance of undesirable feedback in the system is obviated. On the other hand if the inductive field within the building is operating an entirely different and lower frequency than the received broadcast carrier it is possible to effect the re-diffusion within the building by using one or more large horizontally polarized loops within the building which can be efficiently energized with powerful low frequency carrier without danger of disturbing external radiation and field interference.

Referring to FIG. 1 of the drawing there is shown in generalized schematic form a system embodying certain features of the invention. Block 10 represents any radio broadcast transmitter having a transmitting antenna 11 which broadcasts radio programs with, for example, vertical polarization of the electric vector of the radiated waves. The numeral 12 represents a building or similar structure which because of its steel framework acts to attenuate the broadcast signals on the interior of the building. Suitably located for example on the roof of the building 12 is a receiving antenna 13 which may be designed to pick up with high efficiency the vertical polarized waves from transmitter 10, but is relatively inefficient to horizontally polarized waves. Thus the antenna 13 may be a vertical rod antenna, or if desired it may be a directional loop antenna.

The radio frequency signals from the antenna 13 are amplified in a suitable amplifier 14 which may be a class A and class B linear amplifier and which may be located at a convenient point within the building. The amplified and vertically polarized radio waves are then passed through any known phase shifting device or network 15 by means of which they can be brought into the same phase as that of the waves from transmitter 10. Typical phase shifting means are disclosed in Radio Engineers Handbook by Terman, page 949. The output of device 15 is then coupled to one or more large horizontally disposed loops 16, 17, 18 which may be suitably supported either on the floor, ceiling or around the interior walls of the building. The waves from the loops are therefore horizontally polarized, that is, the loops are vertically aligned for null and with the loop turns in a substantially horizontal plane. When the loops are thus energized by the phased waves, they set up respective inductive fields accompanied by respective disconnected or radiating fields. As is well known the field strength of the inductive fields falls off very rapidly beyond a certain distance so that by proper dimensioning of the loops the inductive field can be correlated in effective area with the inside dimensions of the building areas to be serviced with the re-diffused programs. Even if the radiating field accompanying the inductive field should extend beyond the outer walls of the building, by reason of its having been brought into phase with the waves from the transmitter 10 as hereinabove described, deterioration or other interference with the broadcast field pattern is avoided and the effective coverage of that field external of the building can even be enhanced. This latter feature is of great importance in large populated areas having numerous buildings. Current F.C.C. regulations require 10–50 mv./meter for service in large business districts and 2–10 mv./meter for service in residential areas. Any other station operating on the same frequency is subject to overlapping at the 0.5 mv. contour. Because of earth conductivity and absorption by numerous buildings these signal strengths cannot be maintained in thickly populated areas by a low power broadcast station. By means of the system illustrated and described in connection with FIG. 1, not only is re-diffusion of the broadcast service rendered more efficient within the buildings, tunnels, subways, etc., but it also acts to increase the public service coverage of such low power stations within their normal broadcast areas, and tends to make that coverage more uniform. It will be understood, of course, that while the drawing shows the re-diffusion system of the invention in a single building, if it is installed in a large number of buildings the station coverage is correspondingly increased outside those buildings.

We have found that the best results are obtained when the pick-up antenna 13 is symmetrically located with respect to the several inductive loops 16, 17, 18. While the drawing shows the loops of the same peripheral size it will be understood that they may conform in dimensions to the size of the area to be serviced. Preferably the antenna 13 should be located on the common vertical axis of the several loops as indicated by the dot-dash line in FIG. 1. With such an arrangement of a vertically polarized pick-up antenna 13, and the horizontally polarized inductive loops, the said antenna rejects any back radiation that may exist from the loops.

We have also found that with such an inductive rediffusion system with proper phasing and respectively different polarizations, it is possible to design and use a very inexpensive personal receiver which can be supplied to each occupant or customer within the building. In fact, a simple two-transistor radio of the well known reflex kind can be used. The cost of such a receiver can be so low as to permit it even to be given or distributed gratis for advertising purposes or the like to the occupants or customers within the building. Such a receiver is shown in FIG. 2 of the drawing.

Figure 2:
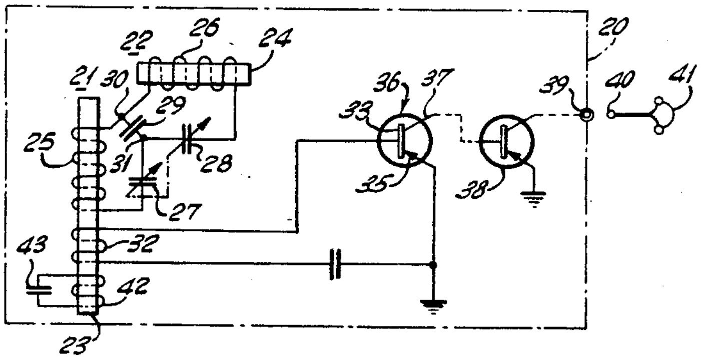
FIG. 2 is a schematic wiring and structure diagram of the novel radio receiver set according to the invention.

Referring to FIG. 2 the radio receiver which is housed within a suitable small box 20 is used to pick up the inductive fields from the loops when the receiver is used within the building and it automatically picks up the broadcasts directly from the transmitter when the receiver is used outside the building. For those purposes it includes a pair of discrete loop or coil antennas 21, 22 which are designed so that one antenna responds efficiently to horizontally polarized waves, and the other antenna responds efficiently to vertically polarized waves. Thus antenna 21 may be wound on a ferrite rod 23 of well known high frequency iron or similar magnetic material. Likewise 22 is wound on a similar ferrite bar 24. The two bars 23, 24 are mounted in right-angled relation within the box 20. The bar 23 is mounted so that when the casing 20 is held for example in a plane approximately parallel to the sheet of the drawing, the said bar 23 is approximately vertical and the bar 24 is approximately horizontal. Bar 23 carries the tuning coil 25 wound around the longitudinal axis of the bar so that when bar 23 is vertical the turns of coil 25 are approximately horizontal and thus will respond to the horizontally polarized waves from any of the loops 16, 17, 18, etc., within the building. Likewise the bar 24 carries a tuning coil 26 which is wound around the longitudinal axis of bar 24 so that when that bar is approximately horizontal the turns of coil 26 are in a substantially vertical plane. Thus the antenna 22 responds to the vertically polarized waves, for purposes to be described.

Figure 3:
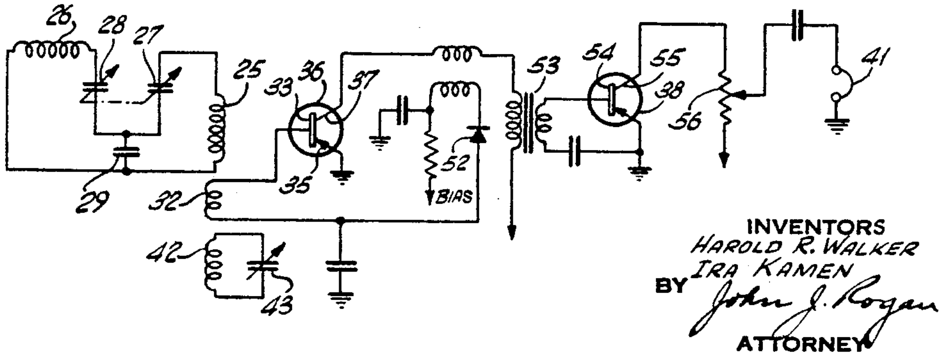
FIG. 3 is a schematic diagram of a reflex transistor radio receiver, embodying the invention.

The antenna coils 25, 26 are each tuned to the desired broadcast frequency by a pair of respective tuning condensers 27, 28. An additional fixed capacitor 29 is connected between the common connection point 30 of the coils, and the common connection point 31 of the tuning condensers. This interconnection of the coils and condensers in effect constitutes a selective band-pass network or filter which increases the selectivity of the receiver especially in the broadcast band. This band-pass feature of the two discrete orthogonally related antennas 21, 22 is of peculiar advantage when the signals are amplified and detected by transistors. The bar 23 is also provided with the usual low impedance link winding 32 which can be connected across the base electrode 33 and the emitter electrode 35 of a radio frequency amplifying transistor 36. The collector electrode 37 can be connected to another transistor 38 for detecting the signal modulations. The output of transistor 38 can be connected to a suitable jack 39 to receive a telephone plug 40 connected to any inexpensive telephone ear-piece 41. If desired, to reduce the cost of the receiving set the transistors 36 and 38 can be interconnected in any well known reflex circuit, a typical one of which is shown in FIG. 3; and to further reduce the cost the ear-piece 41 can be permanently wired directly to the output element associated with transistor 38. The receiving set can be even further reduced in cost by designing it to receive only a single broadcast frequency, for example 590 kc. in which case the capacitors 27, 28 may be inexpensive fixed capacitors of the proper value to tune the antennas each respectively to that single frequency.

The bar 23 also carries an additional antenna coil 42 which, like coil 25, responds to the horizontally polarized antenna field signals from the loops 16, 17 and 18. However, antenna coil 42 is tuned by a shunt capacitor 43 to a special low carrier frequency outside the broadcast band, for example, a frequency of 190 kc. This frequency can be used to deliver to the ear-piece 41 a special service signal either in the form of a voice frequency modulation or a particular audio-frequency tone which may be used for paging, burglar alarm, or any other special service.

The low frequency carrier is applied to the loops 16, 17, 18 from a 190 kc. oscillator-modulator 44 which is modulated by a signal from a suitable audio-frequency source 45 which may be a microphone or a fixed frequency signal. The vertical supply conductors 46, 47 for the loops may be connected to any suitable mixer device comprising for example a coupling transformer whose secondary winding 48 is connected to the conductors 46 and 47 and whose primary windings 49, 50 are connected respectively to the output of the phaser 15 and the oscillator-modulator-amplifier 44. The amplified 190 kc. carrier is connected to the several loops 16 17, 18 so that they produce respective low frequency inductive fields which are horizontally polarized. The amount of inductive field power which is obtainable is inversely related to the carrier frequency applied to the loops. In fact, at the low carrier frequency of 190 kc. the power in the inductive field is at least several times that of the inductive field resulting from the energization of the loops by the broadcast frequency, for example 590 kc.

It will be understood that the vertical supply conductors 46, 47 connecting the phaser 15 and the modulator 44 with the loops are shielded, for example, they may be in the form of a twisted pair of coaxial transmission line, so that they do not set up any disturbing fields. The output of modulator 44 may be amplified in a suitable amplifier (not shown) so that a high level of low frequency power can be fed to the loops. In fact, the difference in the inductive fields from the loops, if they should be energized simultaneously by the broadcast frequency, for example, 590 kc., and by a low carrier frequency, for example, 190 kc., is such that for the same amount of input power to the loops, the inductive field at 190 kc. for practical purposes swamps the inductive field at the broadcast frequency. Thus, even if both inductive fields are picked up by the antenna coil 25, the receiver 20 only produces in its output the signal from source 45. This swamping effect is even further accentuated since the antenna coil 42 is tuned to the low frequency and increases the swamping effect.

The arrangement of FIG. 1 using receivers such as those of FIG. 1 in conjunction with FIG. 2 therefore provides a system of communication which has a number of distinct advantages. In the first place, the broadcast signals can be disseminated within the building with relatively high efficiency, and even if the loops radiate the broadcast frequency outside the building, then by reason of the phase adjustment and horizontal polarization they tend to increase the broadcast field from the transmitter 10 outside the building. Secondly, even though a person inside the building is enabled by means of the radio-receiver of FIG. 2 to pick up the broadcast signals, it is possible for an attendant to swamp the effect of those signals by delivering to the loops 16, 17, 18 any suitable special signal such as paging, burglar alarm or even special announcements such as for advertising purpose and the like. Since the inductive field at the low carrier frequency can be for all practical purposes confined entirely within the building 12, this provides a break-in service which fully complies with the F.C.C. requirements. Thirdly, if a person is listening to the broadcast signals within the building on the special receiver of FIG. 2 which responds to the inductive broadcast fields, then immediately when he leaves the building 12, the receiver automatically picks up the same broadcast programs since under these conditions the vertically polarized antenna 26 immediately and automatically becomes effective on the antenna coil 26. Thus a person who has tuned in the broadcast station within the building can leave the building with the assurance that there is no interruption in the reception of the broadcast service and without requiring any special adjustment or orientation of the receiver with respect to the antenna 11.

While in the foregoing reference has been made to the source 45 as a special audio-frequency signal, the system is capable of modification so as to achieve a so-called diversity receiving effect on the broadcast frequency. Thus, the oscillator-modulator-amplifier 44 may be connected through a suitable switch 50*a* so that in one position it connects the special signal source 45 to the modulator while in the other position it connects the output of a detector-amplifier 51 to the unit 44. The detector-amplifier 51 is connected to the antenna 13 so as to detect the audio-frequency signal modulations. Therefore, when the switch 50*a* connects the detected amplified signals in the broadcast transmission to the unit 44, the loops 46 and 47 are simultaneously fed with the amplified and phased broadcast signals from the phaser 15 at the broadcast frequency, for example of 590 kc., and also by the correspondingly signal modulated 190 kc. carrier from unit 44. One of the advantages of this arrangement is that under the present F.C.C. regulations if a transmitter or radiating source is used for example within a building, the external field or radiated field from such a local source must have a field intensity not in excess of $$\frac{2400}{f_{kc}} \times \text{microvolts per meter}$$

at a distance of 1000 feet from the source. This effectively limits the amount of broadcast frequency power that can be fed into the loops 16, 17, 18 at the broadcast frequency, for example 590 kc. However, under the existing F.C.C. regulations it is possible within the band of 160 kc. to 190 kc. to feed the loops with a very much greater amount of power, for example of the order of one watt. As is well known, the power in the induction field drops off very sharply at a relatively small distance from the source since such power falls off as the fourth power of the distance, whereas in the case of the radiation field falls off as the square of the distance. Thus by detecting and retransmitting the broadcast signals on the 190 kc. carrier, it is possible to feed a great amount of power into the loops without danger of the field extending appreciably beyond the desired area. Therefore not only is a greater field strength produced within the building 12 from the loops but the greater proportion of the receiving power can be effectively confined within the building.

FIG. 3 shows in more detail a preferred form of transistor radio receiver such as is schematically shown in FIG. 2. The elements of FIG. 3 which are the same as FIG. 2 bear the same designation numerals. In FIG. 3 the radio frequency amplified signal on the collector 37 is coupled to a detector 52 which is fed back from the link coil 32 to the base 33. Therefore the transistor 36 performs the double function of a radio frequency amplifier and an audio-frequency amplifier. The resultant audio-frequency signals are applied through the audio-frequency transformer 53 to the base 54 of the audio-frequency amplifier transistor 38 whose collector 55 is connected to the headset 41 and if desired, through a suitable gain control potentiometer 56.

While certain specific equipment and frequencies have been mentioned herein, it will be understood that the same has been done merely for explanatory purposes. Accordingly, various changes and modifications may be made in the disclosed embodiments without departing from the purposes and scope of the invention.

What is claimed is:

1. In a system for re-diffusing within a shielded structure signals derived from a distant source which radiates a modulated radio frequency carrier of a given polarization, comprising in combination, a receiving antenna at said structure which is selective to said polarization, at least one inductive field-producing loop within said structure which is oriented to selectively produce an inductive field which is of a different polarization from said given polarization, a source of sub-radio-frequency carrier at said structure, means connected to said receiving antenna to detect the audio frequency modulations in the said radio frequency carrier, means to modulate said sub-radio-frequency carrier by said detected signals, and means to apply the received radio frequency carrier and the said modulated sub-radio-frequency carrier simultaneously to said loop whereby the ratio of the sub-radio-frequency inductive field from said loop with respect to the radio frequency radiated field therefrom is greatly increased.

2. A system according to claim 1 in which said receiving antenna is selective to vertically polarized waves, and said loop produces a sub-radio-frequency inductive field which is horizontally polarized.

3. A system according to claim 1 in which said structure is a building and said loop extends substantially horizontally around the interior of the building and is symmetrically located with respect to said receiving antenna.

4. A system according to claim 2 in which the means for simultaneously applying the received radio frequency signals and the modulated sub-radio-frequency carrier signals to said loop includes a coupling network having an output connected to said loop, and a pair of inputs each respectively energized by a corresponding one of said signals.

5. A system according to claim 2 in which a phase adjusting means is connected between said receiving antenna and the corresponding one of said inputs.

6. A system according to claim 2 in which a source of local audio frequency signals is provided at said structure, and switch means is provided effective in one position to connect said detector to said modulator and effective in another position to connect said local source to said modulator.

References Cited

UNITED STATES PATENTS

| | | | |
|---|---|---|---|
| 1,668,637 | 5/1928 | Espenschied et al. | 325—9 X |
| 1,695,172 | 12/1928 | Clement | 179—82 X |
| 1,989,466 | 1/1935 | Satterlee et al. | 325—308 |
| 2,280,562 | 4/1942 | Weagant | 325—366 |
| 2,559,613 | 7/1951 | Halstead | 325—308 X |
| 2,628,275 | 2/1953 | Parker | 325—308 X |
| 2,955,286 | 10/1960 | Klein | 343—788 X |
| 3,235,804 | 2/1966 | McIntosh | 325—308 X |

FOREIGN PATENTS

| | | |
|---|---|---|
| 304,781 | 1/1930 | Great Britain. |

OTHER REFERENCES

Nilssen: Proc. I.R.E., July 1961, pp. 1222, 1223, 325–369.

DAVID G. REDINBAUGH, *Primary Examiner.*

JOHN W. CALDWELL, *Examiner.*